(12) United States Patent
Raymond (10) Patent No.: US 8,931,527 B2
(45) Date of Patent: Jan. 13, 2015

(54) TREE PROCESSING HEAD (75) Inventor: Fargeot Raymond, Granby (CA)

(73) Assignee: Metallitech Inc., Acton Vale, Quebec (CA)

(*) Notice: Subject to any disclaimer, the term of this patent is extended or adjusted under 35 U.S.C. 154(b) by 643 days.

(21) Appl. No.: 13/067,973

(22) Filed: Jul. 13, 2011

(65) Prior Publication Data
US 2012/0037275 A1    Feb. 16, 2012

(30) Foreign Application Priority Data
Aug. 14, 2010 (GB) .................................. 1013663.8

(51) Int. Cl.
*A01G 23/093* (2006.01)
*A01G 23/091* (2006.01)

(52) U.S. Cl.
CPC ............ *A01G 23/091* (2013.01); *A01G 23/093* (2013.01)
USPC ......................................... 144/34.5; 144/4.1

(58) Field of Classification Search
CPC ... A01G 23/08; A01G 23/083; A01G 23/087; A01G 23/089; A01G 23/091; A01G 23/093; A01G 23/095

USPC ................ 144/336, 338, 343, 4.1, 34.1, 34.5; 241/101.72; 83/830–834; 56/241; 30/381–387, 379, 379.5, 123, 296.1
See application file for complete search history.

(56) References Cited

U.S. PATENT DOCUMENTS

| 3,734,152 | A | * | 5/1973 | Shields | ........................ 144/4.1 |
| 3,796,242 | A | * | 3/1974 | Albright | ..................... 144/34.1 |
| 4,116,250 | A | * | 9/1978 | Ericsson | ..................... 144/34.1 |
| 4,221,245 | A |   | 9/1980 | Wildey | |
| 2008/0196790 | A1 | * | 8/2008 | Fargeot | ......................... 144/4.1 |

FOREIGN PATENT DOCUMENTS

WO          9501094 A1    1/1995

* cited by examiner

*Primary Examiner* — Shelley Self
*Assistant Examiner* — Matthew G Katcoff
(74) *Attorney, Agent, or Firm* — Welsh Flaxman & Gitler LLC (57) ABSTRACT

A tree processing head for processing a tree element. The tree processing head includes: a body; a scissor assembly mounted to the body and a chainsaw assembly also mounted to the body. The scissor and chainsaw assemblies are selectively usable individually or cooperatively to process the tree element.

16 Claims, 8 Drawing Sheets

TREE PROCESSING HEAD

The present application claims priority from UK Request Application Serial Number 1013663.8 filed on Aug. 14, 2010, the contents of which is hereby incorporated by reference in its entirety.

FIELD OF THE INVENTION

The present invention relates generally to tree processing devices, such as tree pruning and trimming devices and, more particularly, to a tree processing head.

BACKGROUND

The prior art propose numerous cutting head attachments coupled to the distal end of a carrier boom, or the like, for remotely executing tree pruning and trimming operations. More particularly, in some embodiments of the prior art, the cutting head attachment includes a pivotable chainsaw, or rounded saw assembly in coplanar juxtaposition with a scissors or shearing means, thus allowing two types of cutting operations.

Typical examples of the prior art are PCT Publication WO9501094A1, to Widegren (published Jan. 15, 1995), U.S. Pat. No. 4,221,245, to Wildey (issued Sep. 9, 1980), U.S. Pat. No. 4,116,250, to Ericsson (issued Sep. 26, 1978), and U.S. Pat. No. 3,796,242, to Albright (issued Mar. 12, 1974). While these prior art devices can generally fulfill the objective of enabling an operator to remotely cut, trim and/or prune a tree, brushes and the likes, they are also inefficient in executing complex operations such as, for example, rapidly and efficiently selecting and cutting a single branch or a sub-group of branches, among a larger group of tightly parallel branches.

Against this background, there exist a need for an improved tree processing head. An object of this invention is to provide such a tree processing head.

SUMMARY OF THE INVENTION

In a broad aspect, the invention provides a tree processing head for processing a tree element. The tree processing head includes: a body; a scissor assembly mounted to the body, the scissor assembly including a pair of substantially elongated scissor arms, the scissor assembly being movable in a scissor plane between a closed configuration and an open configuration, the scissor arms being substantially parallel to each other in the closed configuration and the scissor arms being angled with a maximal achievable angle therebetween in the open configuration, the scissor arms defining each an inner edge and an opposed outer edge, the inner edges facing each other when the scissor assembly is between the open and closed configurations; and a chainsaw assembly mounted to the body, the chainsaw assembly including a chainsaw and a chainsaw support element mounted to the body and supporting the chainsaw, the chainsaw support element allowing a pivotal movement of the chainsaw about a chainsaw pivot axis; the chainsaw assembly being provided substantially adjacent the scissor assembly and the chainsaw pivot axis being substantially perpendicular to the scissor plane. When the scissor arms are in the open configuration, the chainsaw is pivotable about the chainsaw pivot axis over a range of motion allowing cooperative processing of the tree element jointly and simultaneously by both the scissor assembly and the chainsaw assembly with the tree element inserted selectively between the chainsaw and any one of the inner and outer edges of both the scissor arms. The scissor and chainsaw assemblies are selectively usable individually or cooperatively to process the tree element.

For the purpose of this document, the terminology "substantially" refers to dimensions, geometric relationships and orientations that may differ slightly from the word qualified by "substantially", but not to an extent to which the functionality of the proposed tree processing head is compromised.

The tree element is a part of the tree, such as a branch or the trunk, that is processed by the tree processing head. Processing means pruning or cutting the tree element, either through a shearing action or through a cutting action with a moving element, such as the chain of a chainsaw, among other possibilities.

In some embodiments of the invention, the tree processing head of the present invention is mountable to the distal end of a carrier boom equipped with a controllable pivotable head element that can concurrently maneuver the tree processing head about multiple axis. For example, the tree processing head may be advantageously coupled to the distal end of the operable arm of a tree pruning and trimming head described in U.S. Publication No. 20080196790A1 of Fargeot, published Aug. 21, 2008, which is hereby incorporated by reference in its entirety. The tree processing head may also be advantageously coupled to other types of tree processing equipments such as, for example, a stationary tree processing equipment or the like.

In a manner readily apparent to one skilled in the art of tree pruning and trimming, the tree processing head, thus advantageously coupled to a pivotable head coupling means of a carrier boom, allows an operator use of the scissor arms in a conventional manner for cutting relatively small trees, branches and/or bushes having, for example, a maximum diameter of 7 cm (about 3 inches) or less.

When the scissor arms encounter one or more branches or trees having a relatively larger diameter, for example, 7 cm or more, the operator may use the scissor arms as a gripping means for stably holding the branches, followed with pivotally actuating the chainsaw for efficiently cutting the latter.

Furthermore, with the scissor assembly in the closed configuration and the chainsaw angled outwardly of the outer edges, the operator can first insert the scissor arms between, for example, a pair of selected branches, or groups of branches, then optionally widen the space therebetween, and then finally pivotally actuate inwardly the chainsaw towards the selected branch or branches thus abutting against the outer edges of the adjacent scissor arm. Other complex tree pruning and trimming operations are also possible.

In some embodiments of the invention, the inner and outer edges are serrated. In a variant, the inner edges are beveled.

In some embodiments of the invention, the scissor arms are each pivotable about a respective scissor arm pivot axis, the scissor arm pivot axes being each substantially parallel to the chainsaw pivot axis. Typically, the scissor arms are operatively coupled to each other so as to be synchronously pivotable about the scissor arm pivot axes. For example, the scissor assembly includes a pair of partial gear elements engaged to each other and each rotatable about one of the scissor arm pivot axes, each of the scissor arms being secured to a respective one of the partial gear elements so as to be rotatable jointly therewith about the scissor arm pivot axes. In some embodiments of the invention, the scissor assembly includes a pair of hydraulic cylinders extending between the body and a respective one of the partial gear elements, the hydraulic cylinders being secured to the partial gear elements eccentrically with respect to the scissor arm pivot axes.

In some embodiments of the invention, the scissor arm pivot axes are spaced apart from each other. Typically, the scissor arm pivot axes and the chainsaw pivot axis are spaced apart from each other.

In some embodiments of the invention, the scissor arms overlap each other in the closed configuration.

In some embodiments of the invention, the tree processing head is usable with a carrier boom, the tree processing head comprising a boom mount mechanically coupled to the body for mounting the tree processing head to the carrier boom.

In some embodiments of the invention, the scissor arms are substantially rectilinear.

In some embodiments of the invention, the chainsaw and scissor assemblies are mounted to the body in a substantially juxtaposed and substantially coplanar relationship with respect to each other.

In another broad aspect, the invention provides a tree processing head for processing a tree element, the tree processing head comprising: a body; a scissor assembly mounted to the body, the scissor assembly including a pair of substantially elongated scissor arms, the scissor assembly being movable in a scissor plane between a closed configuration and an open configuration, the scissor arms being substantially parallel to each other in the closed configuration and the scissor arms being angled with a maximal achievable angle therebetween in the open configuration, the scissor arms defining each an inner edge and an opposed outer edge, the inner edges facing each other when the scissor assembly is between the open and closed configurations; and a chainsaw assembly mounted to the body, the chainsaw assembly including a chainsaw and a chainsaw support element mounted to the body and supporting the chainsaw, the chainsaw support element allowing a pivotal movement of the chainsaw about a chainsaw pivot axis; the chainsaw assembly being provided substantially adjacent the scissor assembly and the chainsaw pivot axis being substantially perpendicular to the scissor plane. When the scissor arms are in the open configuration, the chainsaw is pivotable about the chainsaw pivot axis over a range of motion such that the chainsaw is pivotable beyond each of the outer edges. The scissor and chainsaw assemblies are selectively usable individually or cooperatively to process the tree element.

In yet another broad aspect, the invention provides a tree processing head for processing a tree element, the tree processing head comprising: a body; a shear assembly mounted to the body, the shear assembly including a pair of substantially elongated shear arms, the shear assembly being movable in a shear plane between a closed configuration and an open configuration, the shear arms being substantially parallel to each other in the closed configuration and the shear arms being angled with a maximal achievable angle therebetween in the open configuration, the shear arms defining each an inner edge and an opposed outer edge, the inner edges facing each other when the shear assembly is between the open and closed configurations; and a cutting assembly mounted to the body, the cutting assembly including a cutting element support mounted to the body and a cutting element mounted to the cutting element support, the cutting element being movable with respect to the cutting element support for selectively cutting the tree element when the tree element abuts against the cutting element, the cutting element support allowing pivotal movement of the cutting element with respect to the body about a cutting element pivot axis; the cutting element assembly being provided substantially adjacent the shear assembly and the cutting element pivot axis being substantially perpendicular to the shear plane. When the shear arms are in the open configuration, the cutting element is pivotable about the cutting element pivot axis over a range of motion allowing cooperative processing of the tree element jointly and simultaneously by both the shear assembly and the cutting element assembly with the tree element inserted selectively between the cutting element and any one of the inner and outer edges of both the shear arms. The shear and cutting assemblies are selectively usable individually or cooperatively to process the tree element.

In some embodiments of the invention, the cutting element is a chainsaw. In other embodiments, the cutting element is any other suitable cutting element, such as one or more scissor type blades, a rotating wire, such as the ones used in many lawn edge trimmers, a rotating blade, similar to the blade of a lawnmower, or a reciprocating blade, among other possibilities.

In some embodiments of the invention, the shear arms are scissor arms. In other embodiments, the cutting element is any other suitable shear arms, such as clamping arms, among other possibilities.

Other objects, advantages and features of the present invention will become more apparent upon reading of the following non-restrictive description of preferred embodiments thereof, given by way of example only with reference to the accompanying drawings.

DETAILED DESCRIPTION

FIGS. 1 to 7 show various aspects of a tree processing head 10 for processing a tree element (not shown in the drawings) in accordance with an embodiment of the present invention. For example, the tree processing head 10 is usable for tree pruning and trimming operations.

Figure 4:
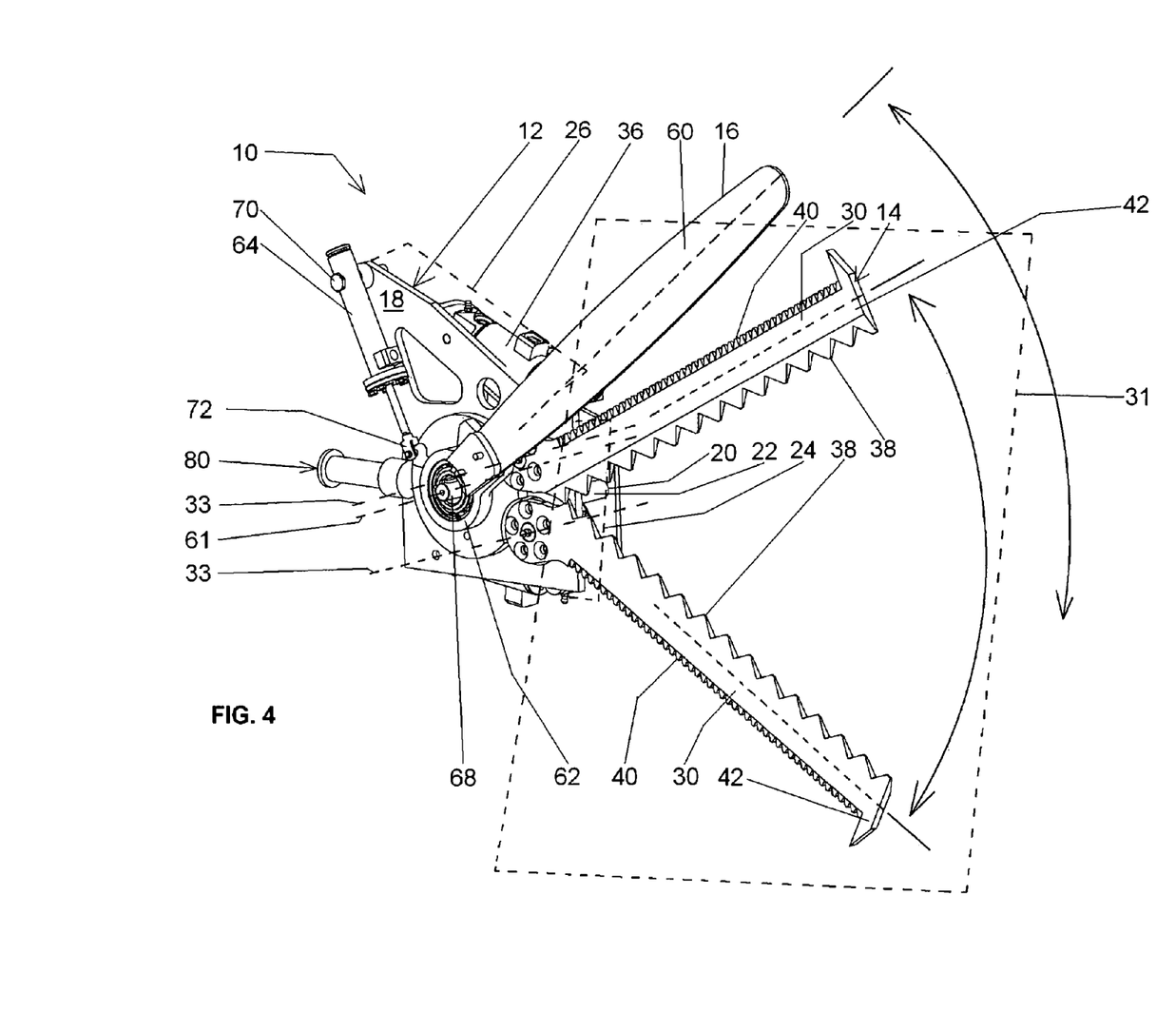
FIG. 4, in a perspective view, illustrates the tree processing head shown in FIGS. 1 to 3 with the scissor assembly in an open configuration and having the chainsaw pivoted upwardly.
Figure 5:
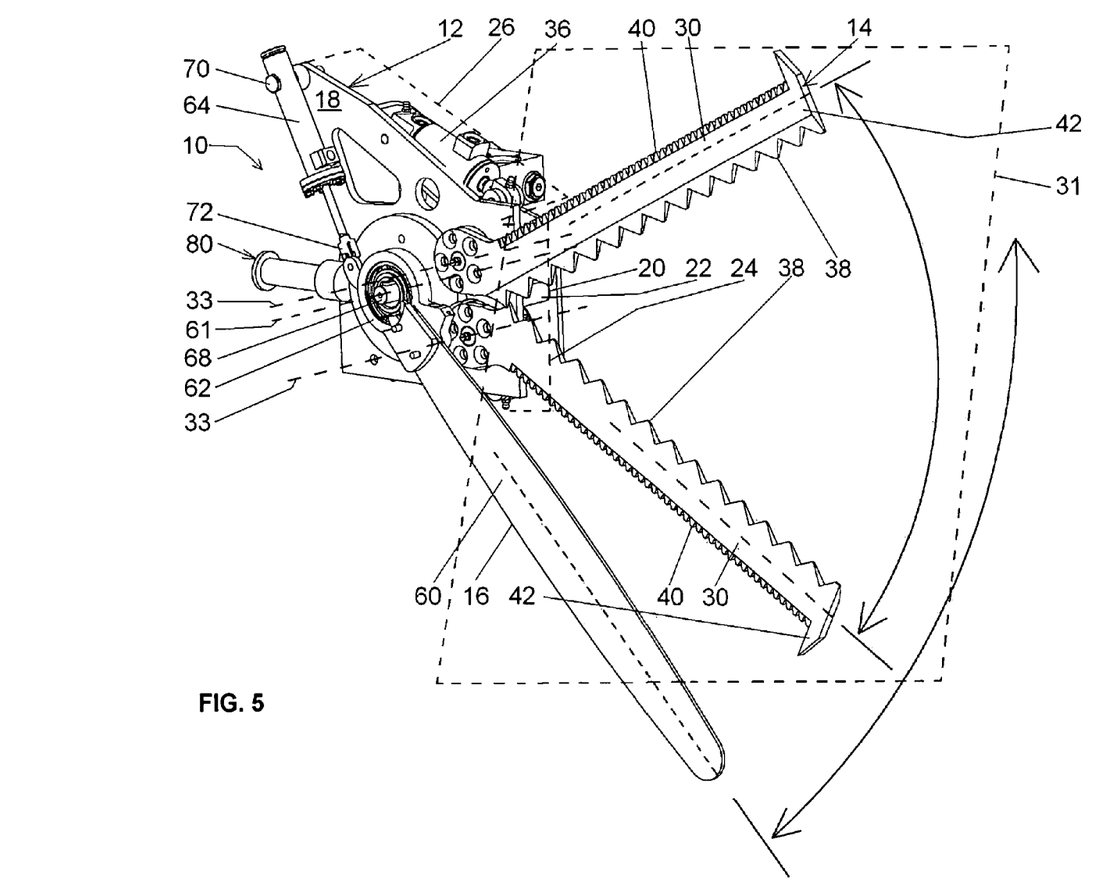
FIG. 5, in a perspective view, illustrates the tree processing head shown in FIGS. 1 to 4 with the scissor assembly in the open configuration and having the chainsaw pivoted downwardly.
Figure 6:
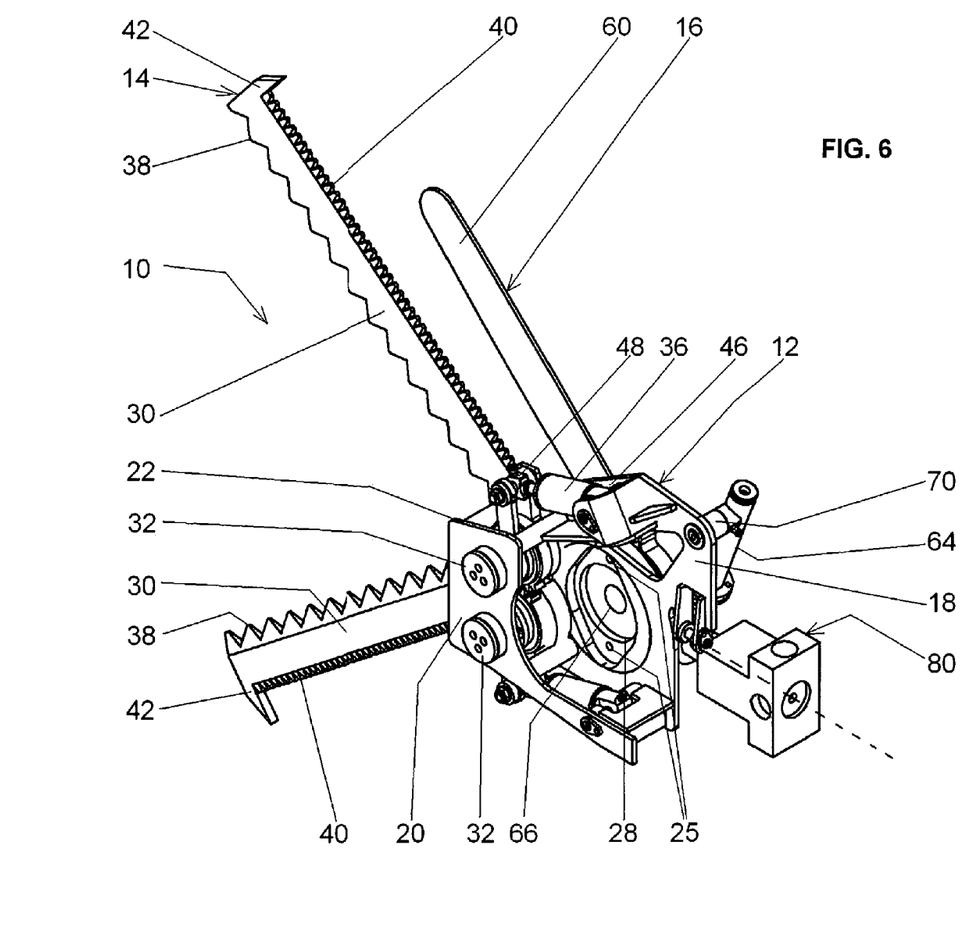
FIG. 6, in an alternative perspective view, illustrates the tree processing head shown in FIGS. 1 to 5.
Figure 7:
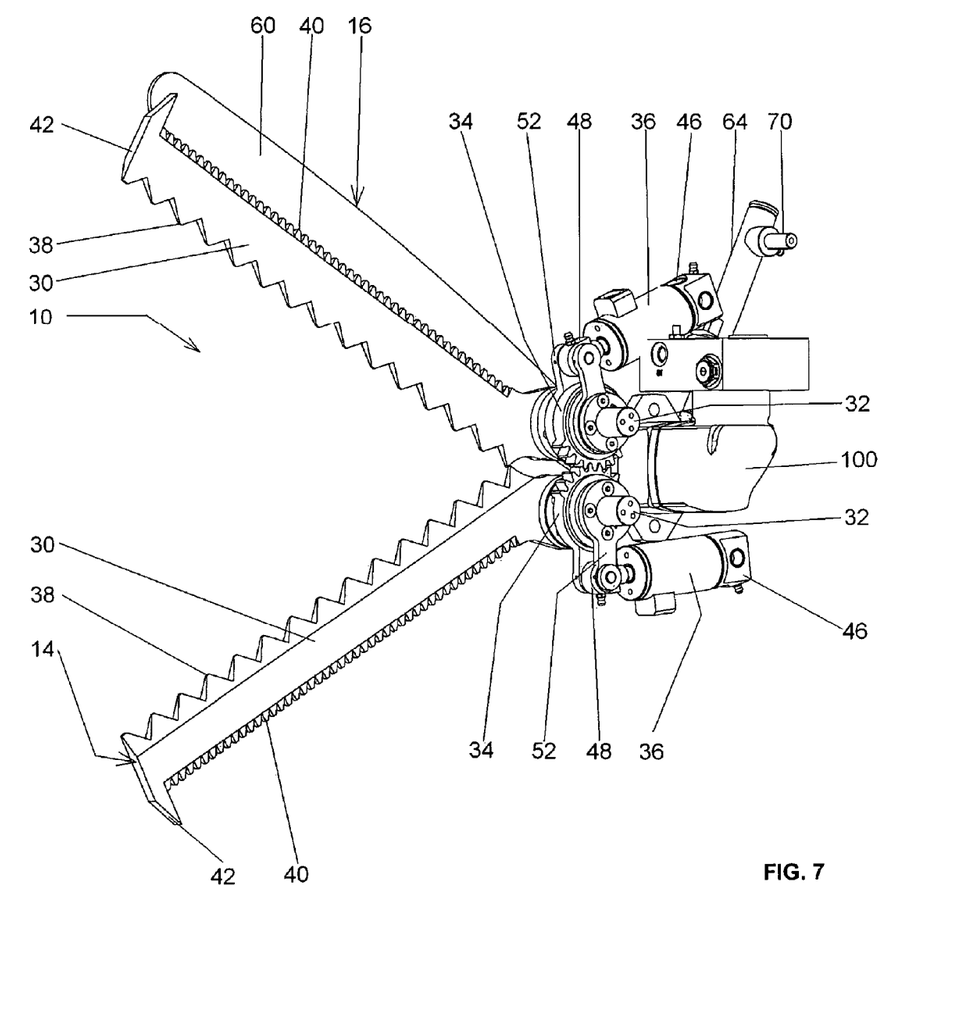
FIG. 7, in a perspective view with parts removed, illustrates the tree processing head shown in FIGS. 1 to 6.

With directional terminology used only for clarity reasons, in the appended drawings, the tree processing head 10 is shown in a right-side, front perspective view in FIGS. 1 to 5, in a left-side, top-rear perspective view in FIG. 6, and in a side elevation view in FIG. 7.

Referring more particularly to FIGS. 1 to 6, the tree processing head 10 generally includes a body 12 having a scissors assembly 14 and a chainsaw assembly 16 mounted thereto, typically in a substantially juxtaposed substantially coplanar relationship with respect to each other and longitudinally extending from a side portion of the body 12. For the purpose of this document, substantially coplanar means that the scissors and chainsaw assemblies 14 and 16 operate in parallel planes that are very close to each other, leaving only enough space to let a chainsaw 60 part of the chainsaw assembly 16 move in a pivotal movement, described in further details hereinbelow, across the scissor assembly without mechanical interference.

The body 12 generally includes a first plate member 18 and a second plate member 20 joined in a substantially parallel and spaced apart relationship with respect to each other through a plurality of suitably sized and configured transversal members 22. However, in alternative embodiments of the invention, any other suitable body is usable.

The first plate member 18 is generally defined as having a substantially square or rectangular main portion 24, and a triangularly shaped and upwardly rearwardly extending upper end portion 26. Furthermore, the first plate member 18 is provided with a typically rounded aperture 28 disposed substantially centrally relative to the rectangular main portion 24 (as best illustrated in FIG. 6). Aperture 28 is provided with a plurality of peripheral mounting holes 25 that are suitably sized and configured for mounting thereto a rotary driving means, which will be further described hereinbelow.

Referring to FIG. 6, the second plate member 20 is generally defined as having a substantially L-shaped configuration having a pair of perpendicular elongated sections extending parallel to and along along a front edge and a bottom edge respectively, of the rectangular main portion 24 of the first plate member 18. Second plate member 20 has an inner portion that is suitably shaped and sized to be substantially clear of a central portion of the aperture 28 of the first plate member 18, as best illustrated in FIG. 6.

As illustrated for example in FIG. 7, the scissors assembly 14 includes a pair of scissor arms 30, a pair of rotatable shafts 32, a pair of mutually engaged, partial gear elements 34, and a pair of double acting hydraulic cylinders 36. However, in alternative embodiments of the invention, any other suitable scissor assembly is usable.

The scissor arms 30 are each substantially elongated, and typically substantially rectilinear. Each of the scissor arms 30 defines a beveled and serrated inner edge 38 and an opposed serrated outer edge 40 and is terminated distally with longitudinally outwardly extending tooth members 42. Each scissor arm 30 also defines a proximal end section 44, better seen in FIG. 3. The scissor assembly 30 is movable in a scissor plane 31 (seen in FIGS. 4 and 5) between a closed configuration (seen for example in FIGS. 1 to 3) and an open configuration (seen for example in FIGS. 4 to 7). The scissor arms 30 are substantially parallel to each other in the closed configuration and the scissor arms are angled with a maximal achievable angle therebetween in the open configuration. The inner edges 38 face each other when the scissor assembly 30 is between the open and closed configurations.

The proximal end sections 44 are suitably adapted and configured to be perpendicularly fastened to a respective rotatable shaft 32 transversally mounted on suitable roller bearing elements, across both the first and second plate members 18 and 20 respectively. The scissor arms 30 are thus each pivotable about a respective scissor arm pivot axis 33 extending along the rotatable shaft 32. Typically, the scissor arm pivot axes 33 are substantially parallel and spaced apart from each other.

Figure 1:
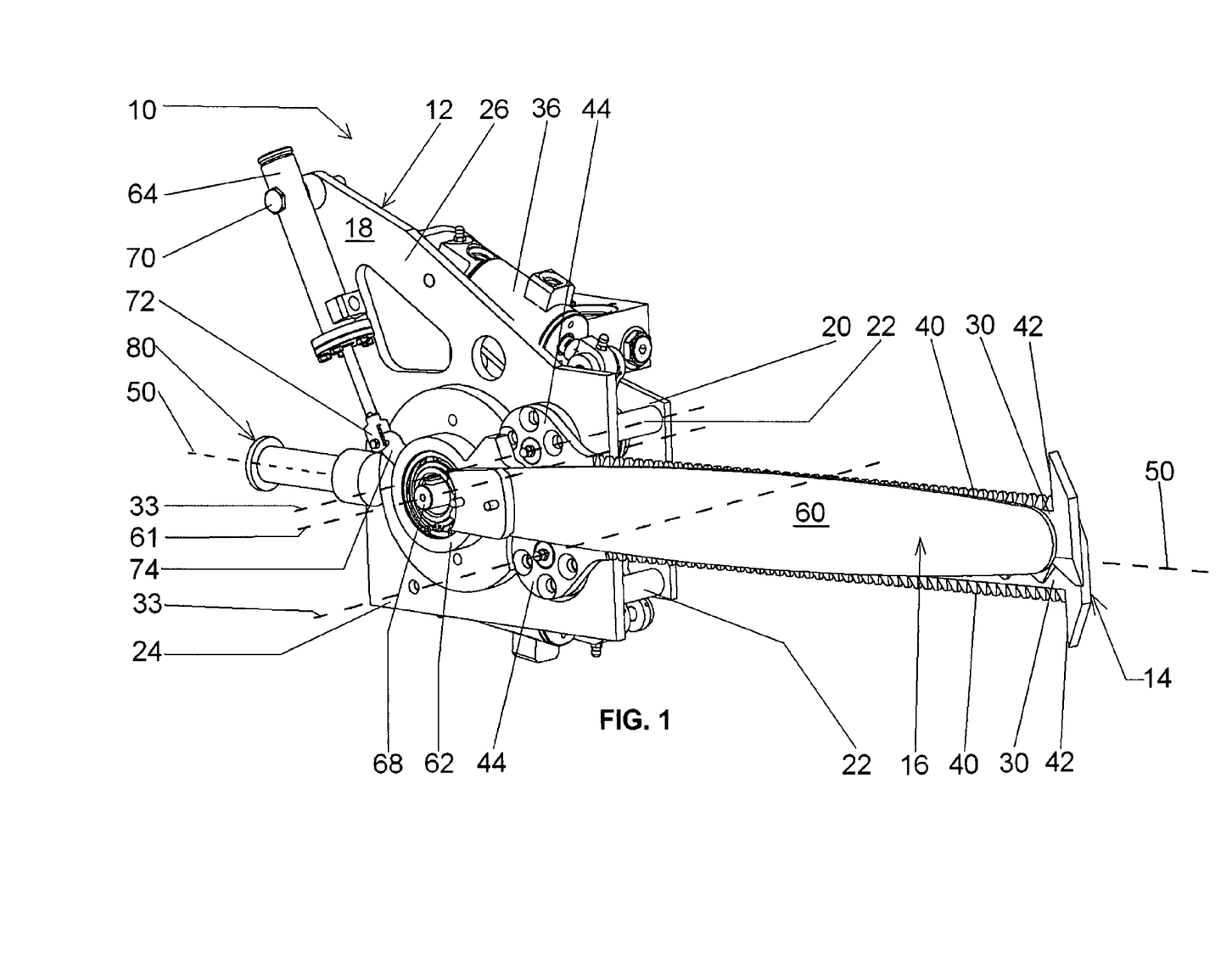
FIG. 1, in perspective view, illustrates a tree processing head according to an embodiment of the present invention, here shown with a scissor assembly thereof in a closed configuration, and an elongated chainsaw thereof longitudinally aligned with the scissor assembly.
Figure 2:
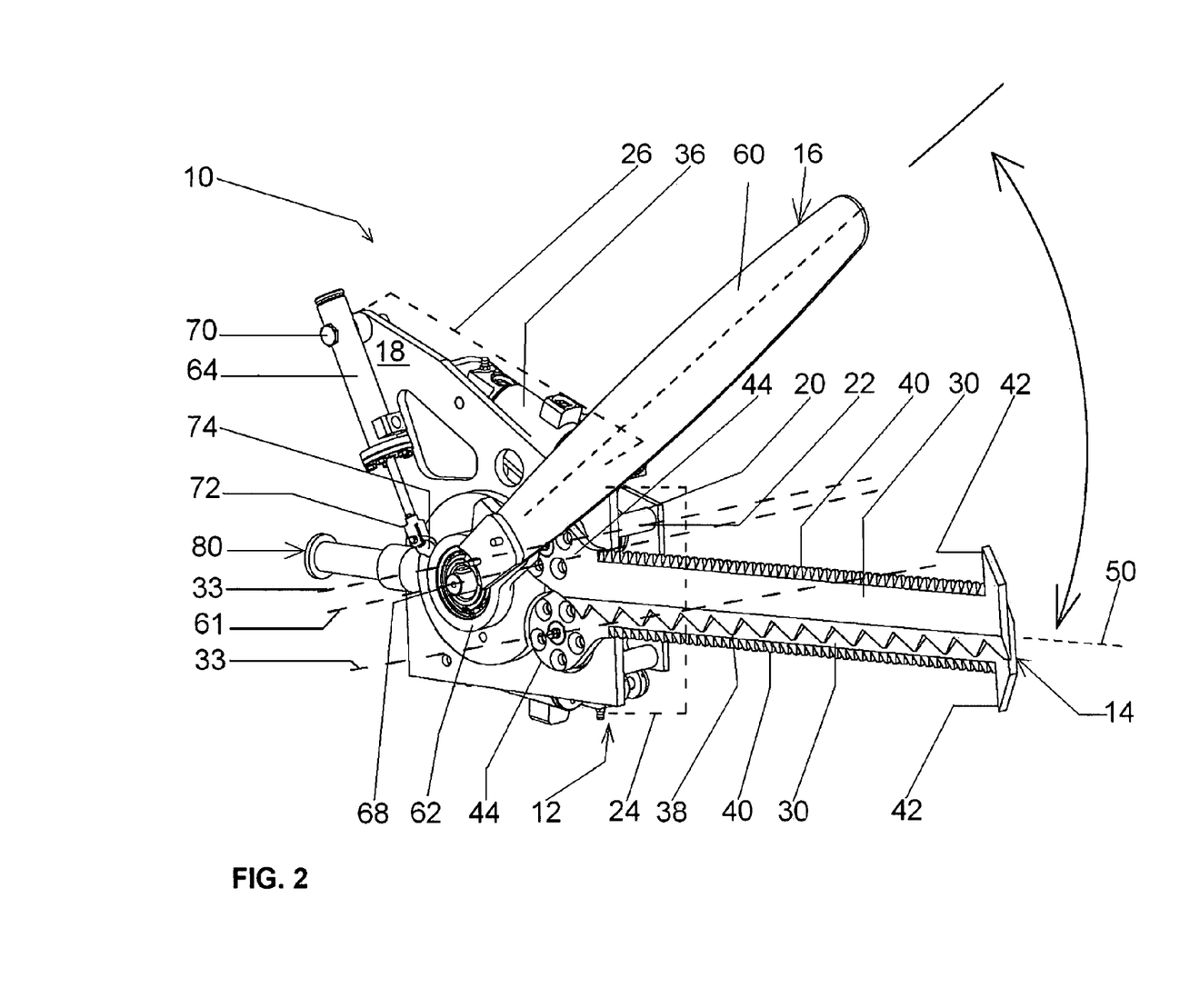
FIG. 2, in a perspective view, illustrates the tree processing head shown in FIG. 1 with the scissor assembly in the closed configuration and having the chainsaw pivoted upwardly.
Figure 3:
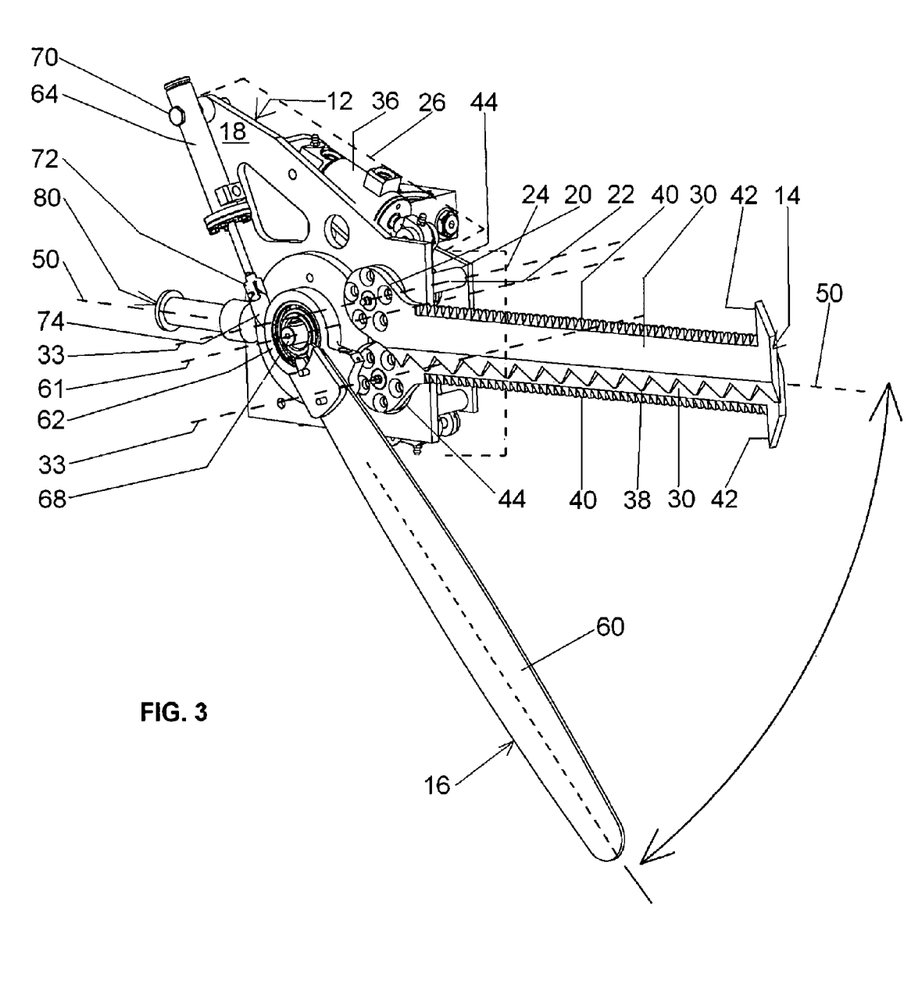
FIG. 3, in a perspective view, illustrates the tree processing head shown in FIGS. 1 and 2 with the scissor assembly in the closed configuration and having the chainsaw pivoted downwardly.

Furthermore, the thus parallel rotatable shafts 32 are suitably disposed transversally between the aperture 28 of the first plate member 18 and the vertical front end of the body 12 such that, when the scissor arms 30 are positioned substantially parallel relative to a central longitudinal axis 50 of the tree processing head 10, they substantially overlap one another in a contiguous substantially coplanar relation, as best illustrated in FIGS. 1 to 3. The scissor arms 30 therefore overlap each other in the closed configuration.

In some embodiments of the invention, as seen in FIG. 7, the scissor arms 30 are operatively coupled to each other so as to be synchronously pivotable about the scissor arm pivot axes 33. To that effect, the scissor assembly 14 includes a pair of mutually engaged partial gear elements 34 that are fixedly mounted coaxially along a mid portion of the pair of rotatable shafts 32 and rotatable about the scissor arm pivot axes 33. Each of the scissor arms 30 is secured to a respective one of the partial gear elements 34 so as to be rotatable jointly therewith about the scissor arm pivot axes 33.

As better seen in FIG. 7, in some embodiments of the invention, the scissor assembly 14 includes a pair of double acting hydraulic cylinders 36 having each a proximal end 46 pivotally connected respectively to an upper and a lower rear end portion of the body 12, and an opposite end 48 pivotally connected respectively to an upper and a lower extending actuating arm 52, that are radially extending from distally opposite peripheral portions of the rotatable shafts 32. The hydraulic cylinders 36 are thus secured to the partial gear elements 34 eccentrically with respect to the scissor arm pivot axes 33.

The pair of double acting hydraulic cylinders 36 are for cooperatively actuating the scissor arms 30 between the open and closed configurations. When in the open configuration, the scissor arms 30 may define an angle that is roughly between 30 and 90 degree, for example.

As seen for example in FIG. 1, the chainsaw assembly 16 is provided substantially adjacent the scissor assembly 14 and generally includes a chainsaw 60, a chainsaw support in the form of a rotatable support disk 62, and an actuator such as a double acting hydraulic cylinder 64. The chainsaw 60 is typically generally elongated and includes a conventional chain guided along a conventional guide bar and movable therealong by a motor.

The chainsaw 60 has a first end thereof fixedly attached in a coplanar relation about an annular portion of the rotatable support disk 62 and extends radially therefrom.

The rotatable support disk 62 is centrally rotatably mounted, through a suitably sized and configured roller bearing element or the like, on the outer peripheral portion of aperture 28 of the first plate member 18. The rotatable support disk 62 allows a pivotal movement of the chainsaw 60 about a chainsaw pivot axis 61 substantially perpendicular to the scissor plane 31. Typically, the scissor arm pivot axes 33 and the chainsaw pivot axis 61 are substantially parallel to and spaced apart from each other.

Furthermore, the rotatable support disk 62 is provided with a central aperture 66 for receiving therethrough the driving shaft of a transversally disposed rotary driving means, for rotatably powering the chainsaw 60.

The rotary driving means is typically an hydraulic motor 100, such as the one shown mounted to the inner side of aperture 28 and the rotatable support disk 62 in FIG. 7. It is to be understood that other suitable types of rotary driving means may be used such as, for examples, a suitably sized and configured combustion engine or an electrical motor.

The drive shaft 68 (seen for example in FIG. 1) of the hydraulic motor may typically extend perpendicularly outwardly from the central aperture 66 (seen for example in FIG. 6) of the rotatable support disk 62, for coupling thereto a suitable chain gear engageable with a chain belt (not shown) which, in turn, is engageable about a chainsaw guide bar.

As seen in FIG. 1, for example, the hydraulic cylinder 64 has a first end 70 pivotably mounted on the distal end of the triangularly shaped portion 26 of the first plate member 18, and an opposite distal end 72 pivotably mounted on a pivot support means 74 extending from a peripheral portion of the rotatable support disk 62. The pivot support means 74 is at a suitable position that is roughly diametrically opposite the chainsaw 60 relative to the rotatable support disk 62.

The double acting hydraulic cylinder 64 is for rotatably actuating the rotatable support disk 62 and chainsaw 60 assembly at a selected angular position between a first angular position, for example, such as illustrated in FIG. 4, and a second angular position, for example, such as illustrated in FIG. 5.

It is important to note that the first and second angular position of the chainsaw 60 are at an angle, relative to the longitudinal central axis 50 of the tree processing head 10, as defined in FIG. 1, that is greater than the angle of each scissor arm 30 at their maximum angular position relative to the longitudinal central axis 50, as best illustrated in FIGS. 4 and 5. Therefore, when the scissor arms 30 are in the open configuration, the chainsaw 60 is pivotable about the chainsaw pivot axis 61 over a range of motion such that the chainsaw 60 is pivotable beyond each of the outer edges 40.

In other words, when the scissor arms 30 are in the open configuration, the chainsaw 60 is pivotable about the chainsaw pivot axis 61 over a range of motion allowing cooperative processing of the tree element jointly and simultaneously by both the scissor assembly 14 and the chainsaw assembly 16 with the tree element inserted selectively between the chainsaw 60 and any one of the inner and outer edges 38 and 40 of both the scissor arms 30. The scissor and chainsaw assemblies 14 and 16 are thus selectively usable individually or cooperatively to process the tree element.

A boom mount 80 is mechanically longitudinally coupled to the body, for example by rearwardly extending from a rear portion of the body 12. Boom mount 80 is suitably adapted and configured for mounting the tree processing head 10 to the distal end of a carrier boom 82, partially seen in FIG. 8, or the like.

Advantageously, the tree processing head 10 of the present invention is typically coupled to the distal end of a carrier boom 82 equipped with a controllable pivotable head element 84 that can concurrently maneuver the tree processing head 10 about multiple axes. For example, the tree processing head 10 may be rotatably operable about the longitudinal axis 50, about a vertical axis, and about a transverse horizontal axis.

The various components of the tree processing head 10 are preferably made of a suitably rigid and rust-proof metal such as, for examples, a surface-treated steel, stainless steel, aluminum, or a combination of these.

In a manner readily apparent to one skilled in the art of tree pruning and trimming, an example of a method of operation of the tree processing head 10 is as follows. Starting with the scissor and chainsaw assemblies 14 and 16 positioned in a configuration similar to the one illustrated in FIG. 4 or 5, an operator can solely operate the scissors arms 30 for conventionally cutting brushes and relatively small branches having, for example, up to about 7 cm (3 inches) in diameter. For this particular operation, the tree processing head 10 may be advantageously coupled to an automatic hydraulic control unit (not shown in the drawings) for automatically actuating the chainsaw 60 in a synchronized parallel configuration, or 'park mode', along one of the adjacent scissor arm 30, for ease of maneuverability in constrained spaces.

When the scissor arms 30 encounters one or more branches or trees having a relatively larger diameter, for example, 7 cm or more, the operator may use the scissor arms 30 as a gripping means for stably holding the branches, followed with pivotally moving the chainsaw 60 about the chainsaw pivot axis 61. For this particular operation, the tree processing head 10 may be advantageously coupled to the automatic hydraulic control unit for automatically pivotally actuating the chainsaw 60, for example, a fraction of a second after the pair of scissor arms 30 have firmly gripped the branches, for ease of maneuverability during repetitive cutting operations of relatively large branches.

In an other operation example, starting with the scissors and chainsaw assemblies 14 and 16 positioned in a configuration similar to the one illustrated in FIG. 2 or 3, an operator may insert the closed pair of scissor arms 30, for example, between two branches, or groups of branches, that are substantially close to one another, and then optionally open the scissor arms 30 for slightly separating the latters. Hence, the operator can pivotally actuate inwardly the chainsaw 60 towards the branch or branches thus abutting against the outer edge 40 of the adjacent scissor arm 30. During this particular operation, the outer edge 40, cooperatively with the tooth member 42, help stabilize the branches and/or brushes along the outer edge 40 of the scissor arm 30, for a successful cutting operation with the chainsaw 60.

In yet an other operation example, starting with the scissor and chainsaw assemblies 14 and 16 positioned in a configuration similar to the one illustrated in FIG. 1, an operator may insert the parallelly aligned chainsaw and scissor assemblies 16 and 14, for example, between tightly parallel branches. Hence, the tree processing head 10 may pivoted 90 degree about its longitudinal axis 50 such that the chainsaw 60 is substantially transversally oriented relative to the branches, followed with selectively actuation of the chainsaw 60 towards one side or the other.

In alternative embodiments of the tree processing head 10, there is no synchronizing means between the two scissor arms 30, e.g., the partial gear elements 34 are replaced with, for example, plain cylindrical members having a suitable diameter such that they are not in contact with each other. Thus, the pivotal movement of each scissor arm 30 may be controllable independently from one another.

This modification may provide an additional advantage to the tree processing head 10 of the first embodiment in that it may allow the execution of more complex tree pruning and trimming operations. For example, when the pivotable element controlling the tree processing head 10 is already at a maximum angle, an operator can still selectively operate only one of the two scissor arms 30 to separate or move away a group of branches, without touching or disturbing an adjacent wall surface, an edge of a fence, a power line, or the like.

Figure 8:
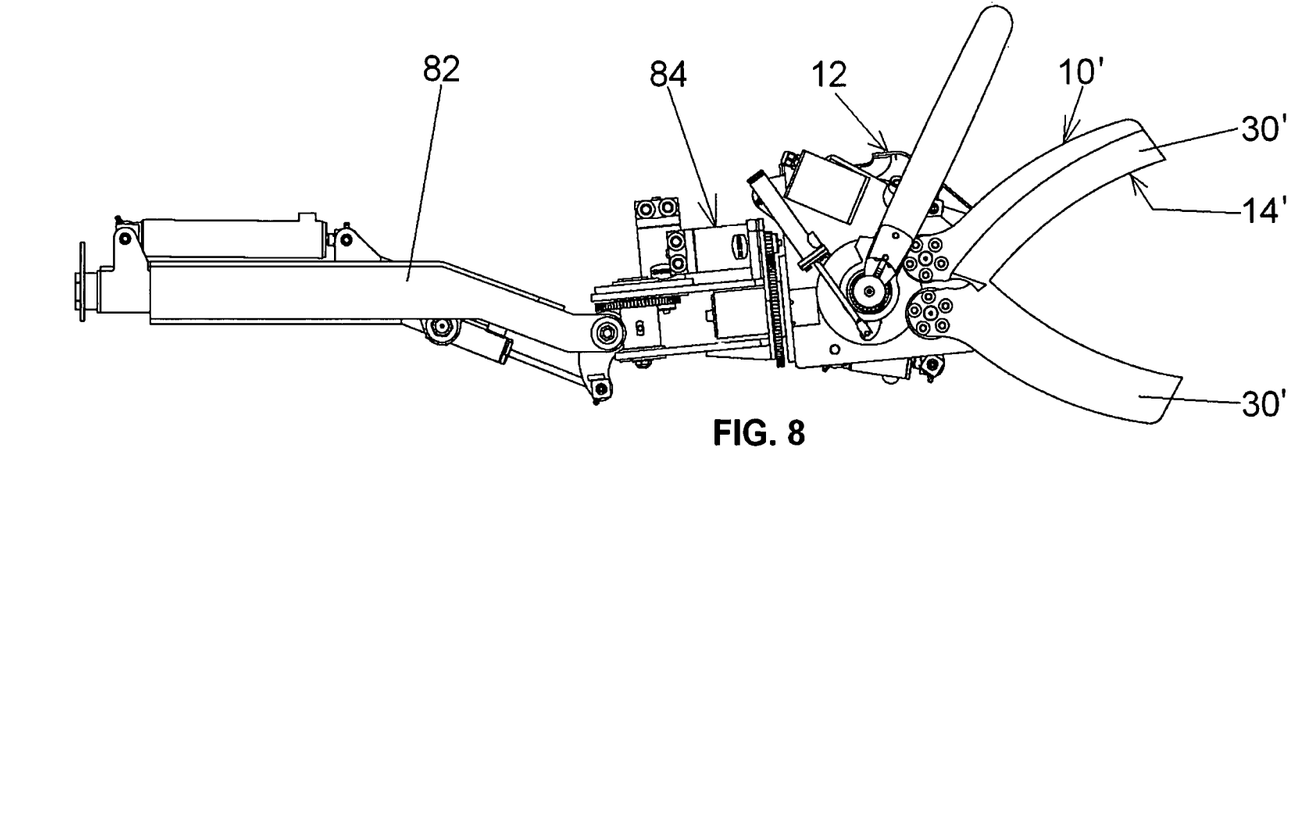
FIG. 8, in perspective view, illustrates a tree processing head according to an alternative embodiment of the present invention.

In other embodiments of the invention, the scissor assembly if replaced by another shear assembly mounted to the body, the shear assembly including a pair of substantially elongated shear arms. The scissor arms 30 are a specific example of the shear arms. The shear arms are usable for cutting a tree element using shear forces when the shear arms are moved towards each other with the tree element provided therebetween. As seen in FIG. 8, the shear arms may take the form of clamping arms 30' in an alternative tree processing head 10' that includes a clamping assembly 14'.

The chainsaw assembly 16 is also replaceable by any other suitable cutting assembly that includes a cutting element movable with respect to a cutting element support for slicing or otherwise cutting through the tree element. Examples of alternative curring elements include one or more scissor type blades, a rotating wire, such as the ones used in many lawn edge trimmers, a rotating blade, similar to the blade of a lawnmower, or a reciprocating blade, among other possibilities.

Although the present invention has been described hereinabove by way of preferred embodiments thereof, it can be modified, without departing from the spirit and nature of the subject invention as defined in the appended claims.

What is claimed is:

1. A tree processing head for processing a tree element, said tree processing head comprising:
    a body;
    a scissor assembly mounted to said body, said scissor assembly including a pair of substantially elongated scissor arms, said scissor assembly being movable in a scissor plane between a closed configuration and an open configuration, said scissor arms being substantially parallel to each other in said closed configuration and said scissor arms being angled with a maximal achievable angle therebetween in said open configuration, said scissor arms defining each an inner edge and an opposed outer edge, said inner edges facing each other when said scissor assembly is between said open and closed configurations; and
    a chainsaw assembly mounted to said body, said chainsaw assembly including a chainsaw and a chainsaw support element, said chainsaw support element being mounted to said body and supporting said chainsaw, said chainsaw support element allowing a pivotal movement of said chainsaw about a chainsaw pivot axis;
    said chainsaw assembly being provided substantially adjacent said scissor assembly and said chainsaw pivot axis being substantially perpendicular to said scissor plane;
    wherein, when said scissor arms are in said open configuration, said chainsaw is pivotable about said chainsaw pivot axis over a range of motion allowing cooperative processing of said tree element jointly and simultaneously by both said scissor assembly and said chainsaw assembly with said tree element inserted selectively between said chainsaw and any one of said inner and outer edges of both said scissor arms; and
    wherein said inner and outer edges are serrated;
    whereby said scissor and chainsaw assemblies are selectively usable individually or cooperatively to process said tree element.

2. A tree processing head as defined in claim 1, wherein said inner edges are beveled.

3. A tree processing head as defined in claim 1, wherein said scissor arms are each pivotable about a respective scissor arm pivot axis, said scissor arm pivot axes being each substantially parallel to said chainsaw pivot axis.

4. A tree processing head as defined in claim 3, wherein said scissor arms are operatively coupled to each other so as to be synchronously pivotable about said scissor arm pivot axes.

5. A tree processing head as defined in claim 4, wherein said scissor assembly includes a pair of partial gear elements engaged to each other and each rotatable about one of said scissor arm pivot axes, each of said scissor arms being secured to a respective one of said partial gear elements so as to be rotatable jointly therewith about said scissor arm pivot axes.

6. A tree processing head as defined in claim 5, wherein said scissor assembly includes a pair of hydraulic cylinders extending between said body and a respective one of said partial gear elements, said hydraulic cylinders being secured to said partial gear elements eccentrically with respect to said scissor arm pivot axes.

7. A tree processing head as defined in claim 3, wherein said scissor arm pivot axes are spaced apart from each other.

8. A tree processing head as defined in claim 3, wherein said scissor arm pivot axes are each spaced apart from said chainsaw pivot axis.

9. A tree processing head as defined in claim 1, wherein said scissor arms overlap each other in said closed configuration.

10. A tree processing head as defined in claim 1, wherein said tree processing head is usable with a carrier boom, said tree processing head comprising a boom mount mechanically coupled to said body for mounting said tree processing head to said carrier boom.

11. A tree processing head as defined in claim 1, wherein said scissor arms are substantially rectilinear.

12. A tree processing head as defined in claim 1, wherein said chainsaw and scissor assemblies are mounted to said body in a substantially juxtaposed and substantially coplanar relationship with respect to each other.

13. A tree processing head for processing a tree element, said tree processing head comprising:
    a body;
    a scissor assembly mounted to said body, said scissor assembly including a pair of substantially elongated scissor arms, said scissor assembly being movable in a scissor plane between a closed configuration and an open configuration, said scissor arms being substantially parallel to each other in said closed configuration and said scissor arms being angled with a maximal achievable angle therebetween in said open configuration, said scissor arms defining each an inner edge and an opposed outer edge, said inner edges facing each other when said scissor assembly is between said open and closed configurations; and
    a chainsaw assembly mounted to said body, said chainsaw assembly including a chainsaw and a chainsaw support element, said chainsaw support element being mounted to said body and supporting said chainsaw, said chainsaw support element allowing a pivotal movement of said chainsaw about a chainsaw pivot axis;
    said chainsaw assembly being provided substantially adjacent said scissor assembly and said chainsaw pivot axis being substantially perpendicular to said scissor plane;
    wherein, when said scissor arms are in said open configuration, said chainsaw is pivotable about said chainsaw pivot axis over a range of motion such that said chainsaw is pivotable beyond each of said outer edges; and
    wherein said inner and outer edges are serrated and said inner edges are beveled;
    whereby said scissor and chainsaw assemblies are selectively usable individually or cooperatively to process said tree element.

14. A tree processing head as defined in claim 13, wherein said scissor arms are each pivotable about a respective scissor arm pivot axis, said scissor arm pivot axes being each substantially parallel to said chainsaw pivot axis, said scissor arms being operatively coupled to each other so as to be synchronously pivotable about said scissor arm pivot axes.

15. A tree processing head for processing a tree element, said tree processing head comprising:

a body;

a shear assembly mounted to said body, said shear assembly including a pair of substantially elongated shear arms, said shear assembly being movable in a shear plane between a closed configuration and an open configuration, said shear arms being substantially parallel to each other in said closed configuration and said shear arms being angled with a maximal achievable angle therebetween in said open configuration, said shear arms defining each an inner edge and an opposed outer edge, said inner edges facing each other when said shear assembly is between said open and closed configurations; and a cutting assembly mounted to said body, said cutting assembly including a cutting element support mounted to said body and a cutting element mounted to said cutting element support, said cutting element being movable with respect to said cutting element support for selectively cutting said tree element when said tree element abuts against said cutting element, said cutting element support allowing pivotal movement of said cutting element with respect to said body about a cutting element pivot axis;

said cutting element assembly being provided substantially adjacent said shear assembly and said cutting element pivot axis being substantially perpendicular to said shear plane;

wherein, when said shear arms are in said open configuration, said cutting element is pivotable about said cutting element pivot axis over a range of motion allowing cooperative processing of said tree element jointly and simultaneously by both said shear assembly and said cutting element assembly with said tree element inserted selectively between said cutting element and any one of said inner and outer edges of both said shear arms; and wherein said said cutting element is a chainsaw and said shear arms are scissor arms, said inner and outer edges being serrated;

whereby said shear and cutting assemblies are selectively usable individually or cooperatively to process said tree element.

16. A tree processing head as defined in claim 15, wherein said inner edges are beveled.

* * * * *